United States Patent [19]

Von Hagen

[11] Patent Number: 5,074,794
[45] Date of Patent: Dec. 24, 1991

[54] SEQUENCING PUZZLE

[76] Inventor: William C. Von Hagen, 981 Mount Dr., Carlisle, Ohio 45005

[21] Appl. No.: 603,423

[22] Filed: Oct. 26, 1990

[51] Int. Cl.[5] ............................................. G09B 1/00
[52] U.S. Cl. .................................. 434/193; 434/171; 434/159
[58] Field of Search .............. 434/159, 167, 171, 175, 434/172, 193, 195, 208; 40/596

[56] References Cited

U.S. PATENT DOCUMENTS

| | | |
|---|---|---|
| 110,213 | 4/1870 | Day . |
| 126,826 | 2/1872 | Muldaur . |
| 1,230,263 | 6/1917 | Alexander . |
| 1,245,475 | 11/1917 | Lindheim . |
| 2,444,768 | 7/1948 | Eby . |
| 2,481,109 | 9/1949 | Grace . |
| 2,875,531 | 3/1959 | Mansfield . |
| 3,290,798 | 12/1966 | Gilbert . |
| 3,302,310 | 2/1967 | Leven . |
| 3,381,394 | 5/1968 | Munro ................................ 434/193 |
| 3,537,202 | 11/1970 | Braun et al. ................... 434/172 X |
| 3,618,956 | 11/1971 | Blederer . |
| 3,918,178 | 11/1975 | Riley ................................. 434/193 |
| 4,361,328 | 11/1982 | Stein et al. . |

FOREIGN PATENT DOCUMENTS 214098  4/1924  United Kingdom ............... 434/171

Primary Examiner—Robert Bahr
Assistant Examiner—Karen A. Richard
Attorney, Agent, or Firm—Wood, Herron & Evans

[57] ABSTRACT

A puzzle for teaching the sequence of a series of elements as number or letters. The elements, in their characteristic outline shapes, are fitted overlapping in sequence into correspondingly shaped pockets in a board. A following element, seated before the next preceding element, blocks the preceding element from being seated.

9 Claims, 1 Drawing Sheet

SEQUENCING PUZZLE

FIELD OF THE INVENTION

This invention relates to puzzles, and more particularly to a puzzle for teaching the sequence of a series of elements such as letters or numbers.

BACKGROUND OF THE INVENTION

Young children sometimes experience difficulty in learning the proper sequence of a series of numbers, even though they may have learned to recognize the individual numbers. For example, a child may recognize the number 5, but may have trouble learning that 5 comes after 4 and before 6; or he may not know the sequence of letters in the alphabet, even though he knows the individual letters. It has been the objective of this invention to provide a teaching puzzle or game which helps the child learn the proper sequence of a given series of elements, be they numbers, letters, or other objects.

SUMMARY OF THE INVENTION

In accordance with this invention a puzzle is provided in which letters, numbers or other discrete objects (all referred to herein as "elements"), each having its usual and characteristic outline shape, must be placed in predetermined sequence in corresponding pockets or seats in a gameboard or panel. Further, the elements and pockets are shaped so that each element must be placed in its pocket before the next following (higher) element in the sequence; the higher element in its pocket blocks insertion of the preceding (lower) element. By way of example, if the elements are the numbers 1, 2, 3 ... 10, the numbers interfit so that the element 1 cannot be seated in its pocket after the element 2 has been placed in its pocket, or the 2 after the 3, and so on; the 2 blocks the 1 from being inserted, the 3 blocks the 2, and so on. The complete sequence of elements can be placed in the pockets only by starting with the lowest element of the sequence and proceeding in order. One thus learns the sequence of the elements by working the puzzle.

"Sequencing" is established by overlapping, interfitting portions of adjacent elements. Their pockets also overlap; each element, when in its pocket, extends partly into the pocket of the next element. Recesses in the elements enable them to fit in their pockets by overlapping one another. More particularly, in the preferred embodiment, the preceding or lower element of each adjacent pair has a recess in its top surface, while the next following or higher element has a corresponding recess in its bottom surface. The recesses open to the sidewalls or margins of the elements, rather than being isolated in the middle of the elements. The portion of each element which is recessed on the top surface extends into the pocket of the following element; and the portion of each element which is recessed on the bottom extends into the pocket of the preceding element. By interfitting their respective top and bottom recesses, both elements can fit into their pockets. Thus, when the first element is placed in its pocket, its top recess receives the bottom recess of the adjacent second element, so that they can overlap. If the second element were seated first, the overlapping portion of the second element would block the "underlapping" portion of the first element.

The recesses are preferably provided in an extremity of one or both elements of each adjacent pair, for example at the top or bottom of a number 1, or at the tip of the tail of a number 2, or in the ends of the rounded lobe of the letter C, and so on, so that the elements will slightly overlap, as if typed a little too closely together. It is not necessary and not desirable to provide tabs projecting outwardly of the conventional outline shapes of the elements, although that could be done if desired. Thus each element is preferably formed in its conventional outline shape, the element 2 being in the shape of a 2, the 3 like a 3, and so on.

DESCRIPTION OF THE DRAWINGS

The invention can best be further described by referring to the accompanying drawings, in which.

DETAILED DESCRIPTION

Figure 1:
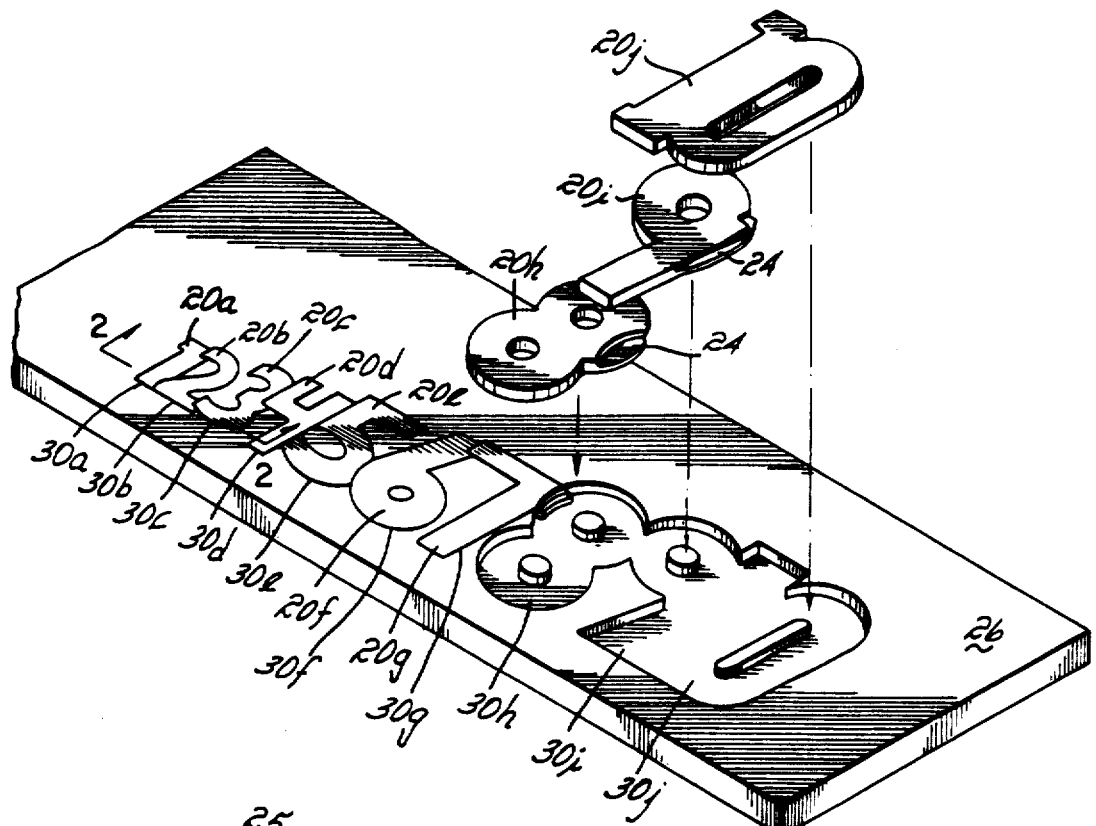
FIG. 1 is an exploded perspective view of a preferred form of sequencing puzzle in accordance with the invention, having the numbers 1-10 as its elements.

In the embodiment shown in the drawings, there are ten elements 20a-20j, in the outline shapes of the discrete numbers 1, 2, ... 10, respectively. The elements are preferably flat and of uniform thickness, for example about 3/16-⅜" thick. The respective elements are seatable in corresponding overlapping, contiguous pockets 30a-30j in a panel or board 10. As can be seen, when seated in its pocket a part of each element extends into the pocket of a following and/or preceding element. When adjacent elements are seated, each overlaps and/or is overlapped by the adjacent element, for example, element 20b (the number 2) marginally overlaps element 20a (the number 1); 3 overlaps 2 and is overlapped by 4, etc. This overlapping is shown in more detail in FIG. 2. More specifically, element 20a (the number 1) has one or more top recesses 24 in its top (upper) surface, which recesses are overlapped by corresponding bottom or undercut recesses 25 in the adjacent element 20b. The bottom recesses 25 of element 20b overlap the top recesses 24 of element 20a. Each recess has the same outline shape as the overlapping portion of the adjacent element.

The pockets 30a-30j, in which the elements can be seated, are contiguous and open into one another, so that the elements can be seated in overlapping relation with their recesses interfitted.

Figure 2:
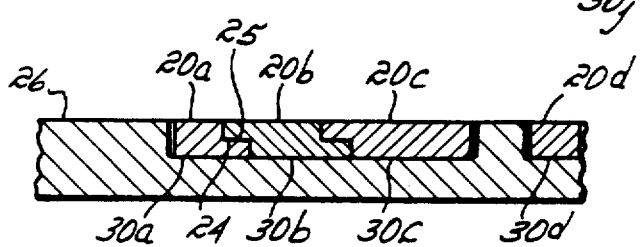
FIG. 2 is an enlarged cross-sectional view taken on line 2—2 of FIG. 1.
Figure 3:
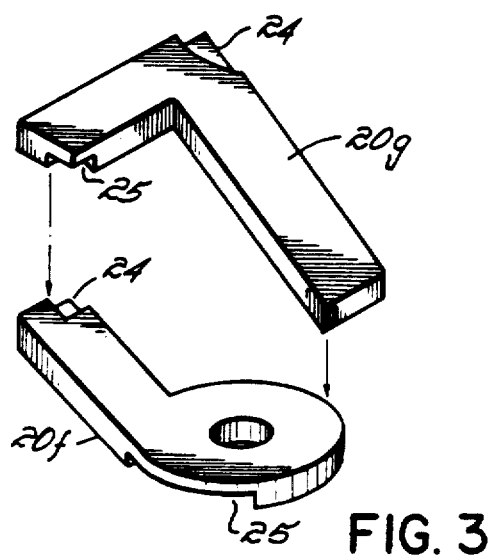
FIG. 3 is an enlarged perspective view of overlapping portions of a pair of adjacent elements.

The elements preferably overlap only slightly (FIG. 3). For example, the number 7 element (20g), overlaps the element 6 (20f) only in a small marginal area at the top edge of the elements. The element 3 (20c) overlaps the 2 element (20b) only at their bottom edges (FIG. 1). Two adjacent elements may overlap in one, two, or more portions at the extremities or in the middle of their margins. Preferably the depth of each recess is one-half the thickness of the element; thus, when overlapped, the upper surfaces of the adjacent elements are preferably flush. The pockets are preferably as deep as the elements are thick, so that all lie flush with board surface 26 as shown in FIG. 2.

From the foregoing, it can now better be seen how the elements must be properly sequenced when being placed in the board recesses. If element 20b is seated in its corresponding pocket 30b in the panel before the preceding element 20a, the subsequent element 20b will block the overlapping portion of element 20a. (In practice, depending on how tightly the elements are made to fit into their pockets, it may be possible to slightly lift an element so that the preceding element can in fact be slipped under it, out of sequence; nevertheless the child or other player will still recognize that the following element does restrict the placing of the preceding element, and thus is out of sequence.) Any following element which is placed in its pocket in advance of an adjacent preceding element will thereby block the immediately preceding element, so that the elements must be inserted in the correct sequence, 1, 2, 3, 4, and so on.

The same principles can readily be applied to letters, or indeed to any type of element in a desired or predetermined sequence.

The elements and the panel or board can be made in various ways, including shaping by hand, but it is believed most convenient to form them by injection molding. Each element can be a distinctive color; or related elements can be painted in similar colors, for example, even numbers one color, odd numbers another color, to further assist in showing relationships.

In order to assist in learning the sequence of elements, the elements may be of progressively increasing heights, so that both height and shape provide an indication of where an element falls in the sequence.

Having described the invention, what is claimed is:

1. A puzzle for teaching the order of elements in a predetermined sequence, comprising,
    a series of discrete elements, each element having a top, a bottom, and a sidewall, each element having an outline shape which is distinctive to that element,
    the first element of each adjacent pair of elements of said sequence having a top recess, the second element of said adjacent pair having a bottom recess, said recesses being shaped and positioned so that the bottom recess of the second element of said pair can be overlapped with and fitted into the top recess of the first element of said pair, and
    a board with a surface having pockets corresponding to the outline shapes of the elements, said pockets arranged in said predetermined sequence, the pockets of adjacent elements overlapping one another and positioned so that the adjacent elements can both be seated only with their said recesses overlapping, the first element of each pair of said sequence being seatable in its respective pocket only if the second element of said pair has not been seated in its pocket, whereby all the elements can be seated in their respective pockets only in the predetermined sequence.

2. The puzzle of claim 1 wherein the portion of an element in which said recess is presented does not project outwardly of the outline of said element.

3. The puzzle of claim 1 wherein the said recess is at an extremity of the outline of said element.

4. The puzzle of claim 1 wherein the said recess opens to the sidewall of the respective element.

5. The puzzle of claim 1 wherein the shape of the top recess of one element corresponds to the shape of the bottom recess of the following element of said sequence.

6. The puzzle of claim 1 wherein the depth of each said recess is one-half the thickness of the element.

7. The puzzle of claim 1 wherein said elements are letters.

8. The puzzle of claim 1 wherein said elements are numbers.

9. The puzzle of claim 1 wherein said elements and their respective sockets progressively increase in height in said sequence.

* * * * *